United States Patent [19]
Schnell

[11] 3,790,001
[45] Feb. 5, 1974

[54] CONVEYING ARRANGEMENT
[75] Inventor: Gerhard Schnell, Stuttgart, Germany
[73] Assignee: Robert Bosch G.m.b.H., Stuttgart, Germany
[22] Filed: May 3, 1971
[21] Appl. No.: 139,611

[30] Foreign Application Priority Data
June 24, 1970  Germany.................. P 20 31 170.0

[52] U.S. Cl. ................. 214/1 BD, 104/93, 104/247, 105/148, 214/769, 214/DIG. 10
[51] Int. Cl. ............................................ B65g 47/90
[58] Field of Search 214/1 BD, 1 BV, 769, 77, 130, 214/131, 140, 768, DIG. 10

[56] References Cited
UNITED STATES PATENTS

| | | | |
|---|---|---|---|
| 2,948,417 | 8/1960 | Haanes............................ | 214/1 BD |
| 2,976,595 | 3/1961 | Cook et al..................... | 214/1 BD X |
| 3,232,446 | 2/1966 | Spurr et al...................... | 214/1 BD |
| 3,074,572 | 1/1963 | Ulinski............................ | 214/770 |
| 3,561,614 | 2/1971 | Tezuka........................... | 214/1 BD |
| 3,061,118 | 10/1962 | Halberstadt................... | 214/DIG. 10 |

FOREIGN PATENTS OR APPLICATIONS
950,757   2/1964   Great Britain.................... 214/1 BD

*Primary Examiner*—Robert J. Spar
*Attorney, Agent, or Firm*—Michael S. Striker

[57] ABSTRACT

A carriage is movable on rails at opposite lateral sides of which objects are to be deposited or picked up. A turnable shaft is provided on the carriage and connected with a parallel-movement linkage, including a toggle joint, to a free end of which there is connected a gripper for engaging objects to be conveyed. A cylinder and piston unit is connected with the pivot of the toggle joint, so that when the unit is operated, the latter collapses and the gripper engages from below an object to be lifted, whereupon turning of the shaft causes the parallel movement to perform an arcuate movement so that the object is moved from one side of the rails to the other for deposition thereat.

8 Claims, 2 Drawing Figures

CONVEYING ARRANGEMENT

BACKGROUND OF THE INVENTION

The present invention relates generally to conveying arrangements, and more particularly to arrangements for conveying of objects which are to be moved from one location to another.

Conveying arrangements of all types are already well known in a great variety of constructions. The present invention is concerned in particular with a conveying arrangement which is intended to make it possible to move objects, particularly pallets, from one location — for instance in front of a shelf unit or rack — to another location where they are to be deposited. It is for instance desirable that such objects, such as pallets be moved from a position adjacent a shelf unit where they are normally stored and to which position they have been brought for pick-up to another location where they are deposited to be subsequently picked up by vehicles, such as forklifts. In particular it is known to have in many industrial installations vehicles which are provided for this purpose and which travel in a predetermined path defined for them for instance by a guide wire or the like, so that they cannot deviate from this path. Thus, these vehicles cannot approach the first location adjacent the racks or shelves, and it is therefore necessary to transport the objects from this first location to a second location adjacent the fixed path traversed by the vehicles, so that the latter are capable of picking the objects up. It follows that in these or analogous circumstances it is essential that the object, hereafter identified for the sake of convenience as pallets, be capable of being deposited at precisely predetermined positions, and conversely that it be possible to pick up the objects at precisely predetermined positions. Furthermore, rapid and safe pick-up and delivery of the pallets requires that the device provided for this purpose which engages the pallets not be permitted to carry out uncontrolled or uncontrollble swinging movements as is for instance the case if cranes were to be used for this type of work.

No such construction capable of fulfilling these requirements is known from the prior art.

SUMMARY OF THE INVENTION

It is, accordingly, an object of the present invention to overcome the aforementioned problems and to provide the above-identified desirable advantages.

More particularly, it is an object of the present invention to provide a conveying arrangement of the type under discussion which has these advantages and is not possessed of the above-identified disadvantages.

Still more particularly, it is an object of the present invention to provide such a conveying arrangement which is simple in its construction and therefore inexpensive to produce.

A concomitant object of the invention is to provide such a conveying arrangement which is highly reliable in its operation and capable of picking up objects at precisely predetermined points and depositing them, again at precisely predetermined points.

In pursuance of the above objects, and others which will become apparent hereafter, one feature of the invention resides in a conveying arrangement, which, briefly stated, comprises a turnable shaft and a parallel-movement linkage connected with the shaft for corresponding movement in response to turning of the same. A load-engaging element is connected with the linkage and mounted for at least partial pivoting beneath a load to be engaged, and for lifting displacement of such load from a first to an at least laterally spaced second position in response to turning of the shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
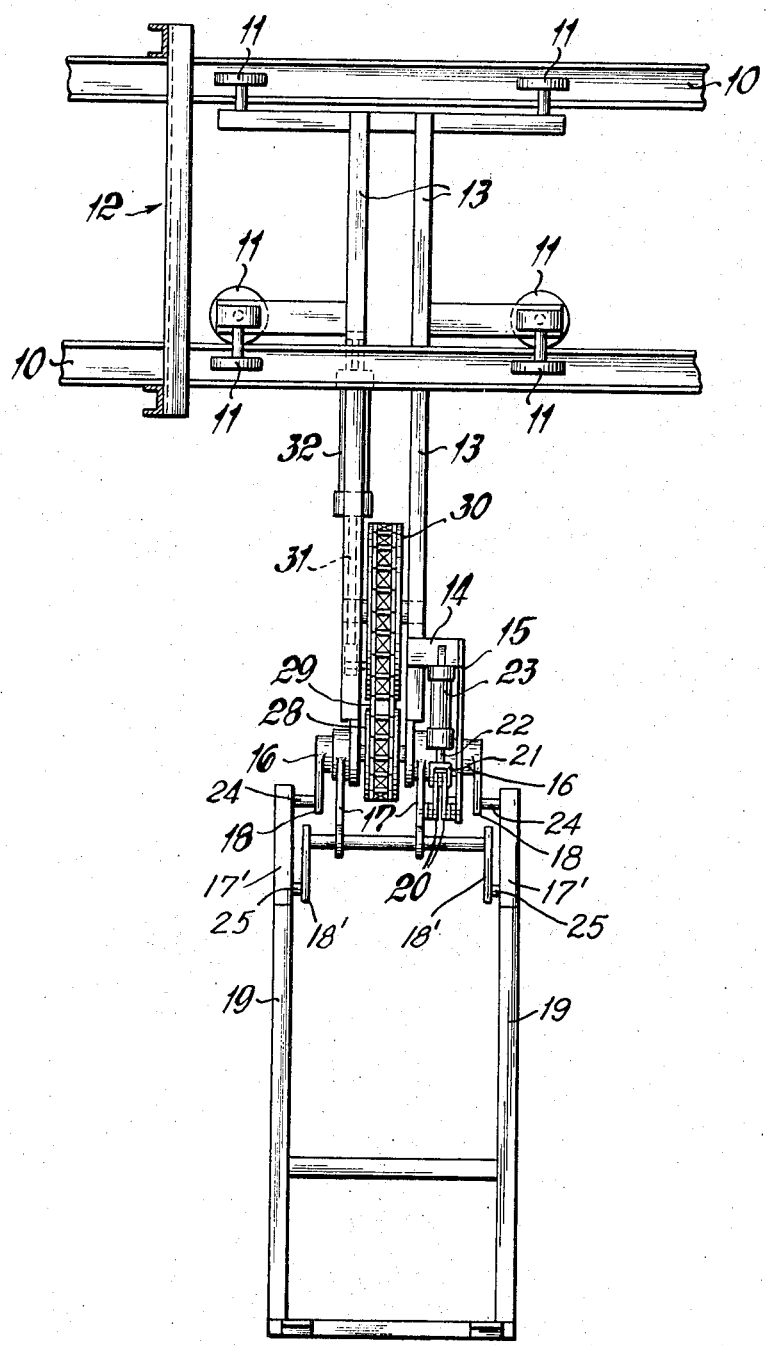
FIG. 1 is a somewhat diagrammatic front view of a conveying arrangement embodying the invention.

Discussing now the drawing in detail, it will be seen that reference numeral 10 identifies rails which may be positioned and mounted in suitable manner, for instance by being suspended from the ceiling of a storage room. Mounted on and displaceable longitudinally of the rails 10 is a carriage 12 provided with rollers 11 to permit such displacement. Carrier 13 is connected to the carriage 12 and in turn connected with frame portions 14 and 15.

As FIG. 1 shows most clearly a shaft 16 is mounted at the lower end of the carrier 13, where it is journalled for rotation. A linkage is connected with the shaft 16 and comprises two pair of levers 17, 17' which are shiftable in parallelism, and two pair of arms 18, 18'.

Figure 2:
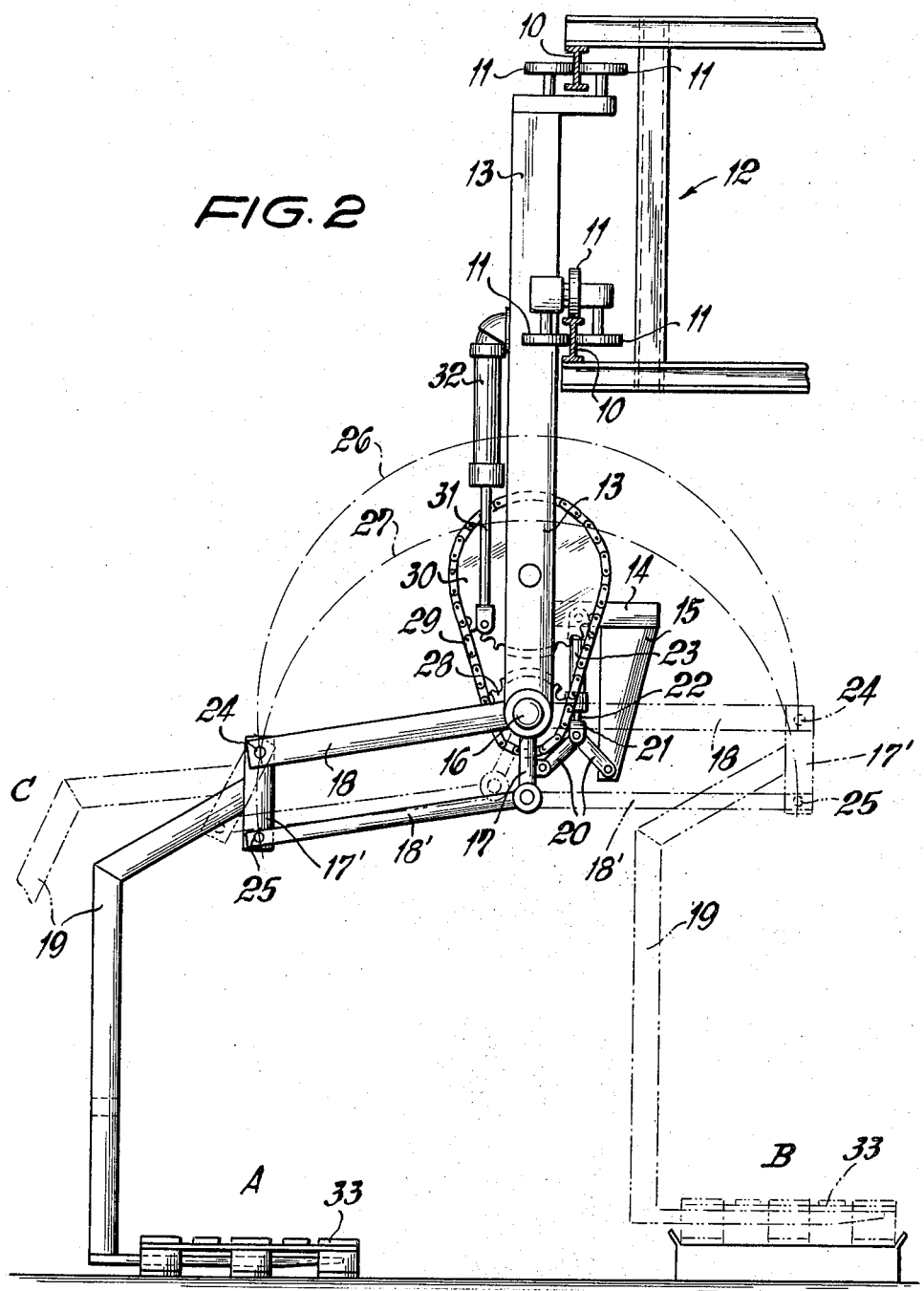
FIG. 2 is a side view of the arrangement shown in FIG. 1.

FIG. 1 shows and FIG. 2 shows more clearly that an engaging element such as a gripper 19 is rigidly connected to one of the lever pairs 17'. A toggle joint 20 comprises in usual manner two sections pivoted at 21, one of the sections being attached at its free end to one of the levers 17 of the other pair. A piston rod 22 of a piston of the cylinder and piston unit 23 — which is preferably hydraulically actuatable — is connected to the pivot 21 whereas the cylinder is connected with the frame portion 14. Operation of the piston collapses the toggle joint 20 whereby the gripper 19 is lowered, whereas, if the piston is operated in a sense erecting the bell-crank lever 20, the gripper 19 is lifted.

Of course, the gripper 19 must also be moved in such a manner as to displace an object or pallet which it engages from one position to another, for instance from the position A to a second position B (compare FIG. 2). This is effected by turning the shaft 16 through approximately 180° with a resulting positional change of the parallel-displaceable linkage 17, 17', 18 and 18'. Pivots 24 and 25 connecting the arm pairs 18 with the lever pairs 17 move in arcuate paths 26 and 27 which are illustrated for orientation in broken lines in FIG. 2. In other words, these paths 26 and 27 are traversed by the pivots 24 and 25 when the shaft 16 is turned through approximately 180° as clearly evident in FIG. 2.

The turning of the shaft 16 is effected in the illustrated embodiment by means of a first gear 28 which is coaxial with the shaft 16 and rigid therewith. A second gear 30 is provided, and a drive chain 29 is in motion-transmitting engagement with gears 28 and 30, with the latter being connected at one of its end faces adjacent its periphery with a piston rod of a piston assembly 31 of a — preferably hydraulically operated — cylinder and piston unit 32 which is fast with the carrier 13. It is clear that operation of the piston assembly 31 causes the gear 30 to turn, whereby motion is transmitted to gear 28 via the chain 29, and the shaft 16 turned about its axis.

The operation of the illustrated embodiment will already be clear from what has been set forth above. Assuming, for instance, that a pallet 33 is to be picked up at the location A, the carriage 12 is moved on the rails 10 until the gripper 19 is adjacent the pallet 33. While the cylinder and piston unit 23 is so operated that the toggle joint 20 is erected which causes the linkage 17, 17', 18 and 18' to move approximately and the gripper 19 to the broken-line position identified with reference character C. Renewed operation of the cylinder and piston unit 23 in a sense opposite to that employed previously causes the toggle joint 20 to become collapsed, whereby the gripper 19 is pivoted underneath the pallet 33. It is now in position to pick up the pallet.

In the next operating step the cylinder and piston unit 32 is actuated to thereby turn the gear 30 and transmit via the gear 28 a rotary component of movement to the shaft 16, turning the same through approximately 180°. In so doing, the gripper 19 picks up the pallet 33 at the position A and moves it to the position B where it deposits it in the location identified with broken lines. Now the cylinder and piston 23 is again operated in a sense erecting the toggle joint 20 so that the gripper 19 can be pivoted out from beneath the pallet 33 and the arrangement freed for further use.

It is hardly necessary to emphasize when the pallet or other load has been picked up at the location A, the carriage 12 may be advanced along the rails 10 in direction normal to the movement performed by the gripper 19, before the pallet is deposited again. In other words, the pallet or other load may be picked at a location A at one lateral side of the rails 10, whereupon the carriage may be advanced along the rails, and the gripper then may perform its above-discussed movement so that the pallet is deposited at a location B at the opposite lateral side of the rails but which is spaced from the location A longitudinally of the rails 10, rather than being directly opposite the location A. It also goes without saying that it is similarly possible to pick up a load at the location B and to transport it to the location A.

Naturally, fluid sources must be provided for the cylinder and piston units, and a motive source must be provided for the carrige, but none of these features form a part of the present invention and are therefore not illustrated or discussed. Their provision is fully within the scope of those having skill in the art.

It will be understood that each of the elements described above, or two or more together, may also find a useful application in other types of constructions, differing from the types described above.

While the invention has been illustrated and described as embodied in a conveying arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a conveying arrangement, a combination comprising a turnable shaft; at least one parallel-movement linkage comprising a first lever having an end portion pivoted about said shaft and a free end portion spaced from said pivoted end portion, a first arm pivoted on said free end portion of said first lever and having a free end, a second arm rigidly attached to said shaft so as to be turnable therewith and having a free end, and a second lever interconnecting said free ends of said arms in such a manner that said arms extend parallel to each other and said second lever extends parallel to said first lever; a toggle joint having two lever sections having respective free ends and respective pivotally connected ends, one of said free ends being connected with said free end portion of said first lever and the other of said free ends being connected with a stationary support; a cylinder-and-piston assembly fixedly mounted on said stationary support and having a piston rod connected with said connected ends of said lever sections for erecting and collapsing said toggle joint; and a load-engaging element having an engaging portion and rigidly connected to said second lever so as to be displaceable therewith for displacement of said engaging portion beneath a load to be engaged in response to the displacement of said toggle joint and for lifting displacement of such load, together with said engaging portion, from a first to an at least laterally spaced second position in response to turning of said shaft.

2. A conveying arrangement as defined in claim 1; and mounting means turnably mounting said element on said linkage.

3. A conveying arrangement as defined in claim 1, wherein said shaft is turnable through substantially 180°.

4. A conveying arrangement as defined in claim 1, further comprising a gear drive having a first gear rigidly attached to said turnable shaft, and a second gear operatively associated with said first gear; and a cylinder-and-piston unit pivotably attached to said stationary support and having a piston rod pivotally connected to said second gear for effecting displacement of the same.

5. A conveying arrangement as defined in claim 4, said gear drive further comprising a drive chain engaging with said first and second gears in motion-transmitting relationship.

6. A conveying arrangement as defined in claim 1, further comprising a pivot connecting said free end of said second arm with said second lever for pivotal displacement of the latter in relation to the former in response to a displacement of said cylinder-and-piston assembly transmitted to said second lever by said toggle joint, said first lever and said first arm, and for a corresponding displacement of said load-engaging element about a pivot axis defined by said pivot.

7. A conveying arrangement as defined in claim 6, wherein said axis is at least substantially horizontal.

8. A conveyor arrangement as defined in claim 1, further comprising an additional parallel-movement linkage similar to and interconnected with said one parallel-movement linkage so as to move in concert with the same.

* * * * *